3,142,930
FISHING FLOAT
Frederick A. Lambach, Omaha, Nebr., assignor to Plastilite Corporation, Omaha, Nebr., a corporation of Nebraska
Filed July 24, 1963, Ser. No. 297,418
3 Claims. (Cl. 43—44.95)

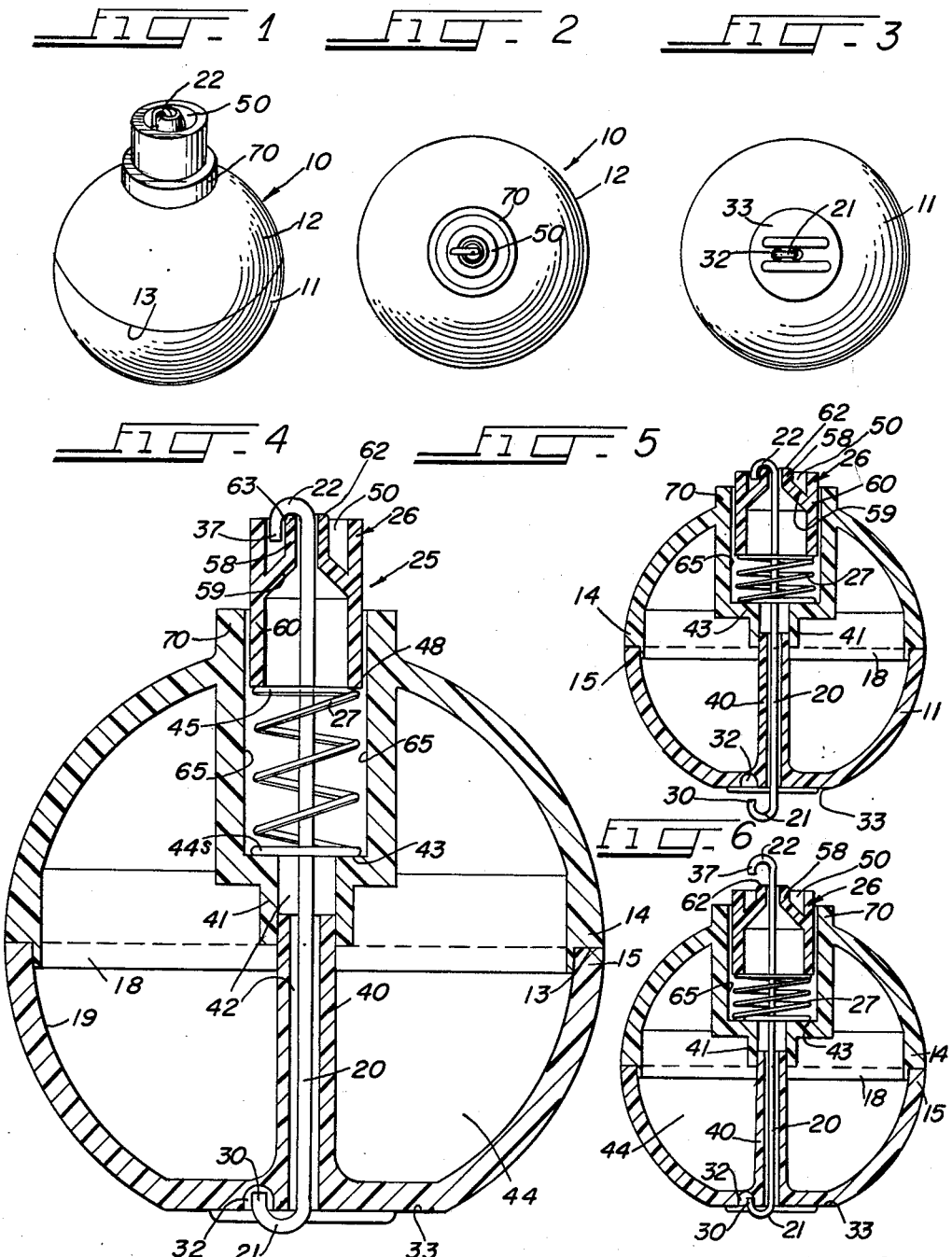

This invention relates to a fishing float and more particularly to a fishing float adapted to be attached to a fishing line.

The fishing float to which the present invention is directed is of the kind comprising a pair of hemispherical hollow members abutted together to form a generally spherical float. A pair of diametrically opposed hooks are used to secure a line to the top and/or to the bottom of the float. This general type of float has had wide commercial success and is produced in large quantities, so that improvements in its construction which facilitate either automatic assembly or use by fishermen are of significant economic importance.

One problem in automatic assembly operations of a float of this type is the difficulty in orienting the spherical float to assure that a central bore therein is properly aligned for receiving a wire shaft, the opposite ends of which are bent to form the hooks. The central bore also receives a spring and plunger assembly which retains the fishing line tightly secured in the bight of the opposed hooks. Accordingly, it is an object of the present invention to orient the spherical float during assembly operations by affording an annular collar extending upwardly from the spherical surface of the float for engagement by an orienting mechanism to assure proper orientation of the spherical float during assembly of the spring and plunger assembly and the hooked member.

A further object of the invention is to achieve a more accurate guiding of the spring biased plunger by guiding the plunger exteriorly of the spherical surface of the float by a collar projecting from the spherical surface.

Heretofore, one hook of the wire shaft has been seated within a small aperture in the plunger of the spring plunger assembly. Considerable difficulty has been experienced in positioning this hook in this aperture, both during manufacture and during use in the field by fishermen. Accordingly, it is another object of the present invention to alleviate the need for accurately aligning a hook with an aperture in the plunger by providing an annular recess in the top of the plunger. With this construction, the end of the hook may be seated within any portion of the annular recess.

A further object of the present invention is to achieve an improved clamping of a small fishing line, such as a lightweight monofilament fishing line, by extending the clamping portion of the plunger upwardly of the outer surface of the plunger. The clamping portion of the plunger is formed with a rounded contour fitting within the curved portion of the hook.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying these same or equivalent principles may be made as desired by those skilled in the art without departing from the present invention and the purview of the appended claims.

In the drawings:

FIG. 1 is a perspective view of the fishing float constructed in accordance with the present invention;

FIG. 2 is a plan view of a fishing float constructed in accordance with the present invention;

FIG. 3 is a bottom view of the fishing float;

FIG. 4 is an enlarged cross sectional view of the fishing float with each of the hooked ends of the wire shaft disposed in their respective hook seats;

FIG. 5 is a sectional view showing the plunger depressed into the upper spherical portion of the float and with the lower hook extending beneath its seat;

FIG. 6 is a sectional view showing the plunger depressed within the upper spherical half of the float and with the upper hook disposed above its seat.

Referring now to the drawings, there is shown in FIG. 1 a generally spherical fishing float 10 having a lower semi-spherical half 11 and an upper semi-spherical half 12 abutted together and joined at a seam 13. The semi-spherical halves 11 and 12 are preferably constructed of thin-walled molded plastic, as best seen in FIG. 4, and have complementary seat portions 14 and 15 abutted together at the seam 13. The seat portion 14 of the upper hemispherical half 12 has a dependent inner circular flange 18, which is seated against the interior surface 19 of the wall of the lower half 11 of the float 10. The upper and lower semi-spherical halves 11 and 12 are bonded together by a suitable adhesive or plastic solvent to form the generally spherical float 10.

For the purpose of securing a fishing line to the float 10, the float has a wire shaft 20 extending through the interior thereof, the opposite ends of the wire shaft 20 being formed with inwardly turned hook portions 21 and 22. The wire shaft 20 is of greater length than the diameter of the sphere of the float and its hook portions 21 and 22 are biased into complementary seats therefor by a spring and plunger assembly 25. The spring and plunger assembly 25 has a plunger 26 biased by a coiled spring 27 into engagement with the upper hook 22 of the wire shaft 20 and hence the lower hook 21 is biased into a complementary seat in the lower hemispherical member 11.

To attach a fishing line to the lower hook 21, the wire shaft 20 and plunger 26 are moved downwardly to compress the coil spring 27, until the lower hook 21 assumes the position shown in FIG. 5 wherein the point 30 of the lower hook 21 is disposed outwardly of its complementary seat 32. After the fishing line is inserted between the pointed end 30 of the hook 21 and the bottom surface 33 of the lower spherical half 11 and into the eye of the hook 21, the plunger 26 is released. The spring 27 forces the plunger 26 and the wire shaft 20 to move upwardly to seat lower hook 21 within the seat 32. The fishing line is thus gripped in the bight between the curved portion or eye 21 and the bottom surface 33 of the spherical float.

In order to attach a fishing line to the top of the float 10, the plunger 26 is depressed within the spherical float 10 while the lower hook 22 of the wire shaft 20 is held against corresponding downward movement, so that the pointed end 37 of the upper hook 22 is spaced from both the top of the plunger 26 and the upper spherical half 12 of the float 10. The fishing line is then placed under the curved portion or eye of the hook 22. The plunger 26 is then released to move upwardly under the urging of spring 27 to engage the fishing line in the bight between the plunger 26 and the hook 22.

The spherical halves 11 and 12 each have a central cylindrical hollow sleeve 40 and 41 integrally formed on their respective halves. Sleeves 40 and 41 have their end portions telescoped one within the other to join the halves at their centers. As seen in FIGS. 4, 5, and 6 the wire shaft 20 is received within the bores or hollowed portions 42 of the sleeves 40 and 41. The hollow sleeve 41 of the upper spherical half 12 has an interior shoulder spring seat 43, upon which seat rests a flat turn 44s of the coil spring 27. The spring 27 has an opposite flat turn 45 in engagement with a lower end wall 48 of the plunger 26. With the float halves 11 and 12 joined together and the sleeves 40 and 41 telescoped within one another, the interior hollow space 44 is a sealed air pocket into which water is foreclosed from entering.

The plunger 26 is of improved and unique construction in that it has formed in the upper portion thereof an annular cavity or recess 50, which is adapted to receive the pointed end 37 of the upper hook 22. As heretofore explained, the point of a prior art hook, such as the hook 22, had to be aligned with a small circular aperture which was complementary in diameter to the wire forming the wire shaft 20. With such an arrangement considerable time and difficulty was experienced in locating the end 37 of the hook 22 within the small aperture, both during the manufacturing processes and during the utilization of the float 10 by a fisherman. With the annular recess 50, the plunger 26 can be rotated to any position and the point 37 of the hook 22 will still be received in annular recess 50. Hence, the need for orienting and locating the pointed end 37 of the hook 22 relative to a small aperture has been eliminated. Also, the plunger 26 can be rotated without twisting or breaking the wire shaft 20. The prior art devices are subject to destruction by children, who turn the plunger and, because the hooked end of the wire shaft is sealed in an aperture, twist the wire shaft.

The plunger 26 has a cylindrical clamping portion or annular ring 58, which is joined by oblique or conical walls 59 to the outer cylindrical wall or annular ring 60 of the plunger 26. In order to facilitate the clamping of the fishing line by the upper hook 22, the cylindrical clamping portion 58 of the plunger 26 terminates in a rounded surface 62 that fits neatly within the curved interior portion 63 of the hook 22. Thus, the curved interior portion 63 of the upper hook is able to move into complete engagement with the curved, rounded surface 62 and contact monofilament fishing lines of small diameter and of lightweight test. The rounded surface 62 of the plunger 26 extends upwardly above the plane of the top surfaces of the cylindrical walls 60 of the plunger 26 so as to enable the operator to readily place the fishing line within the bight between the hook 22 and the clamping portion 58 of the plunger 26.

The plunger 26 is guided for reciprocatory movement within cylindrical side walls 65 of the sleeve 41. Heretofore, difficulty has been experienced in prior art floats in that the plunger 26 was not guided exteriorly of the spherical float and hence had a tendency to rotate within the cylindrical seat and turn the float sideways. According to the present invention, this tendency has been alleviated by an outer integrally formed collar 70 formed on the upper half 12 of the float 10, which surrounds a portion of the plunger 26 extending exteriorly of the float 10, so as to afford external guidance for the plunger 26 when it is in the position shown in FIG. 4.

The annular collar 70 performs dual functions in that it also serves as a locating collar for orienting the spherical joined halves 11 and 12 preparatory to receiving the wire shaft 20, spring 27 and plunger 26. That is, the collar 70 affords a convenient projection for grasping by a mechanical tool, and, upon being grasped, the bores 42 are located and can be quickly oriented to the vertical. Thus, the spherical float 10 can be rapidly aligned to have its hollow bores 42 vertically aligned, whereas with prior art devices, it was difficult to determine whether or not the spherical member had its central bore aligned or canted at an angle to the vertical.

Since floats of this general classification are produced in very large quantities and at small cost, the attaining of additional guidance by a guiding collar 70 provides increased effectiveness of the float at low cost and at the same time affords a locating collar for orienting the float, facilitating the positioning of the vertical bore of the float 10 preparatory to receiving the wire shaft 20 and the plunger and spring assembly 25.

Also, the unique plunger assembly 25 facilitates the manufacture and assembly of float 10 by eliminating the need for precisely locating the seat for the upper hook 22. Furthermore, the increased height of the clamping portion of the plunger 26, along with the rounded portion thereon, facilitates the clamping of lightweight fishing lines, which heretofore have been difficult to clamp against a top flat surface on the plunger.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A fishing float for attachment to a fishing line having a first portion thereof and a second portion thereof:

a lightweight float body having an axial bore extending therethrough, with one end portion of said bore affording a spring seat;

a biasing spring mounted within said spring seat;

a plunger, having a central axial aperture, extending into said bore and into engagement with said spring, said spring biasing said plunger outwardly of said bore;

a shaft extending axially of said bore and through said plunger aperture, said shaft having first and second hooked end portions for hooking said first portion of the line with said plunger and for hooking said second portion of the line with said float body;

a pair of inner and outer annular rings with an annular recess therebetween in said plunger for receiving said first of said hooked ends of said plunger on the said inner ring, said first of said hooked end portions having its terminal end extending into the recess between said rings, said plunger being rotatable while said first hooked end portion is on the inner ring and with its terminal end disposed in said annular recess and said plunger is biased to its maximum extent outwardly of said bore;

and a surface on said float body opposed to the movable plunger having an aperture of dimension just slightly greater than the diameter of the said second hooked end of said shaft to receive therein said second hooked end portion of the said shaft.

2. A fishing float as defined in and by claim 1, wherein the float body is substantially spherical and wherein said plunger projects outwardly beyond the surface of the spherical body and the surface of the body opposite the plunger is substantially flat, said aperture receiving the hooked end of said second hooked end portion therein for grasping said second portion of the line, said flat portion also having spaced ribs substantially in parallelism and the said aperture for receiving the second hooked end portion being between these ribs so that the said second portion of the line when gripped by said second hooked end portion will urge the said second portion of the line against said ribs.

3. The fishing float is defined in and by claim 1, wherein the float is substantially spherical and the plunger projects outwardly through an opening in the periphery of the float, and a rigid collar extending outwardly from the surface of the sphere and defining the said opening, and the collar acting as a guide for the plunger.

References Cited in the file of this patent

UNITED STATES PATENTS

| | | |
|---|---|---|
| 2,758,410 | Cowsert | Aug. 14, 1956 |
| 2,876,581 | Schmidt | Mar. 10, 1959 |
| 2,876,582 | Schmidt | Mar. 10, 1959 |
| 2,965,999 | Marsh | Dec. 27, 1960 |